INVENTOR.
HUMBERT M. FERNANDEZ
BY Julian C. Renfro
ATTOR.

INVENTOR.
HUMBERT M. FERNANDEZ
BY
Julian C. Renfro
ATTOR.

NONREFERENCE PULSE POSITION DEMODULATOR

Filed June 29, 1961

INVENTOR.
HUMBERT M. FERNANDEZ
BY
Julian C. Renfro
ATTOR.

United States Patent Office 3,142,806
Patented July 28, 1964

3,142,806
NONREFERENCE PULSE POSITION DEMODULATOR

Humbert M. Fernandez, Orlando, Fla., assignor to Martin-Marietta Corporation, a corporation of Maryland
Filed June 29, 1961, Ser. No. 120,635
5 Claims. (Cl. 329—107)

This invention relates to the transmission and receiving of digitized analog information in a nonreference pulse position modulation system, and more particularly to a demodulator for converting pulse position modulated pulses representing speech or other information into a useful output without the necessity of transmitting synchronizing pulses to maintain a reference.

In the usual prior art pulse position modulation system it is necessary to transmit some form of synchronizing pulses to create a local reference for the purpose of demodulating the signal, and then in a second channel in the communication system it is necessary to transmit the pulse position modulated pulses. In various forms of demodulators of this type, a sawtooth or an equivalent wave form is derived from the synchronizing pulses, and the pulse position modulated pulses are caused to gate portions of the sawtooth waveform to an output circuit, thus creating a stepped waveform which is subsequently smoothed and filtered to remove unwanted components from the output. The filtered output is a predictable approximation of the original modulating waveform, with the degree of approximation depending upon the sampling rates and the excellence of the smoothing and filtering techniques.

Certain prior art vacuum tube demodulators have been proposed as nonreference demodulators, but in all known instances such devices have depended for their operation upon peculiar properties of certain types of vacuum tubes, thus amounting to devices having very limited scope of application. In contrast, my invention employs the normal properties of either transistors or vacuum tubes, and is not in any manner limited to one or the other.

The encoder with which my invention is used transmits encoded analog information in the form of pulses modulated in time domain. At the encoder, the highest analog frequency to be encoded is sampled by a rate of at least twice the frequency to be encoded, and for example a sampling rate of 8 kilocycles can be used for encoding a 3 kilocycle speech band. The encoder output is of course coupled to suitable transmitting equipment.

The present decoder follows a suitable system for receiving and reproducing the time modulated pulses emitted by the transmitter equipment, and demodulates the time modulated pulses by converting the time duration between a PPM pulse and a nonexisting reference pulse into a stepped waveform. This stepped waveform is then passed through a bandpass filter to smooth out the stepped waveform, with the resultant signal being amplified and then connected to a suitable output device such as a loudspeaker.

Because it is unnecessary to follow the prior art procedure of converting time modulated signal pulses into analog information by the use of synchronizing or referencing pulses and also unnecessary to be able to discriminate signal pulses from these reference pulses, a 50% saving in information to be transmitted is afforded by the use of this invention, with an accompanying saving in cost and complexity of such equipment due to the elimination of these reference pulses from signal pulses in the decoder. A device of this type finds particular application in sytsems in the nature of the Discrete Address Communication System with Random Access Capabilities invention of McKay Goode, Seral No. 107,194, filed May 2, 1961.

A nonreference pulse position demodulator according to this invention broadly comprises a waveform generator operating approximately at the average frequency of a source of pulse position modulated pulses, a sampling circuit for sampling the amplitude of the waveform generator at times determined by the pulse position modulated pulses from the pulse position modulated pulse source, and memory means for retaining the amplitude of said samples to obtain an average direct current voltage approximately proportional to the phase difference between the sawtooth waveform of the pulse position demodulator and sampling rate means of said pulse position modulated pulse source. This direct current voltage is advantageously utilized to modify and correct the frequency of said waveform generator to cause it to become and remain in synchronism and proper phase relationship with the sampling rate means in the pulse position modulated pulse source.

These and other objects, features and advantages of this invention will be made clearer from an inspection of the appended drawings in which.

Figure 1:
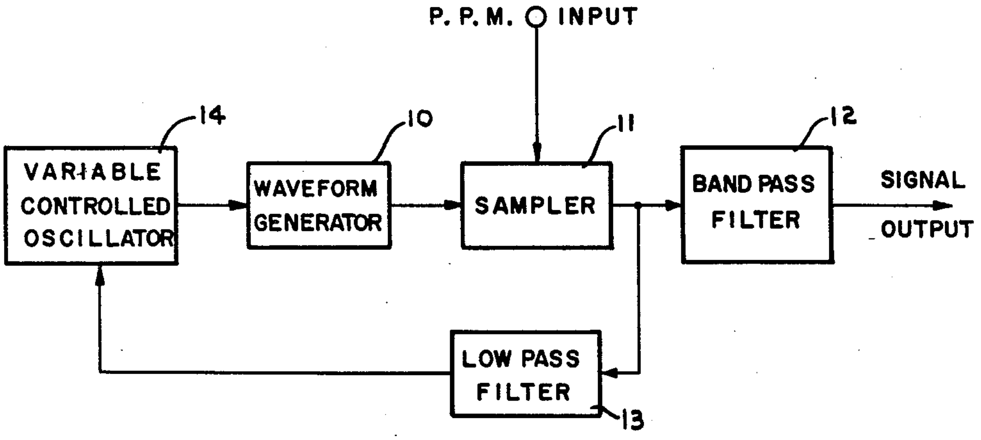
FIGURE 1 is a simplified block diagram of a basic form of my demodulator.

Referring to FIGURE 1, which represents my invention in its simplest form, waveform generator 10 is coupled to one of the inputs of sampler 11, the other input to sampler 11 being pulse position modulated signals occurring at the PPM Input. The output of the sampler is coupled to both a bandpass filter 12 and a low pass filter 13. This output is the result of the sampler reproducing the amplitude of the waveform generator 10 at the time the pulse position modulated pulses occur. The sampler 11 contains a memory circuit in its output which holds the amplitude corresponding to each sample until the next sample occurs. Thus, the output consists of two components; one, a stepped alternating voltage which when passed through the bandpass filter, becomes the signal output, the other an average D.C. (or slowly varying signal) which is related to the phase difference between the output of the waveform generator and a similar waveform generator, part of the transmitting apparatus which generates the pulse position modulated signals. Since it is desired that these two signals be in close synchronism, the output of the low pass filter is used to control the frequency of a variable controlled oscillator 14 which is coupled to the waveform generator 10 and serves as a synchronizing signal for it. The overall performance of this closed loop circuit keeps the variable controlled oscillator 14 operating at the correct rate and phase to properly demodulate the pulse position modulated input signals.

Figure 2:
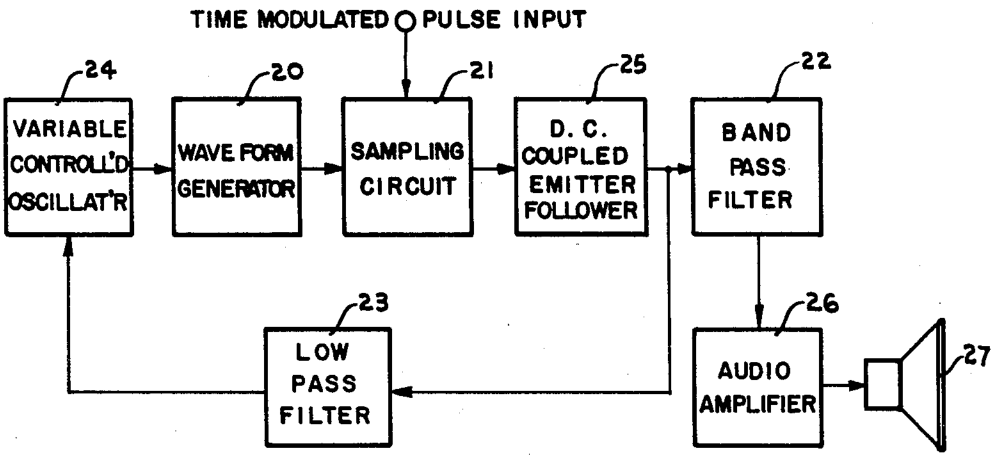
FIGURE 2 is a block diagram similar to FIGURE 1 but illustrating the use of additional circuit components.

In applying the principles of my invention as set forth in FIGURE 1, it may be convenient to provide isolation between the sampling circuit and the bandpass and low pass filters, respectively. This is illustrated in FIGURE 2, which utilizes similarly numbered compoents to FIGURE 1, but in addition utilizes a D.C. coupled emitter follower 25 which couples the sampling circuit 21 to a bandpass filter 22 and a low pass filter 23. Also shown in FIGURE 2 is an audio amplifier 26 and a loudspeaker 27 for making practical use of the signal output of the bandpass filter. The invention, however, is not limited to audio output, for it is suitable for signals of any frequency and waveform which can be converted to pulse position modulation.

The components of the block diagram shown in FIGURE 2 function exactly as similarly numbered components in FIGURE 1, except that the bandpass filter and the low pass filter have negligible effect on the output of the sampling circuit as a result of the isolation and impedance transformation accomplished by the D.C. coupled emitter follower, thus improving the performance of the invention.

Figure 3:
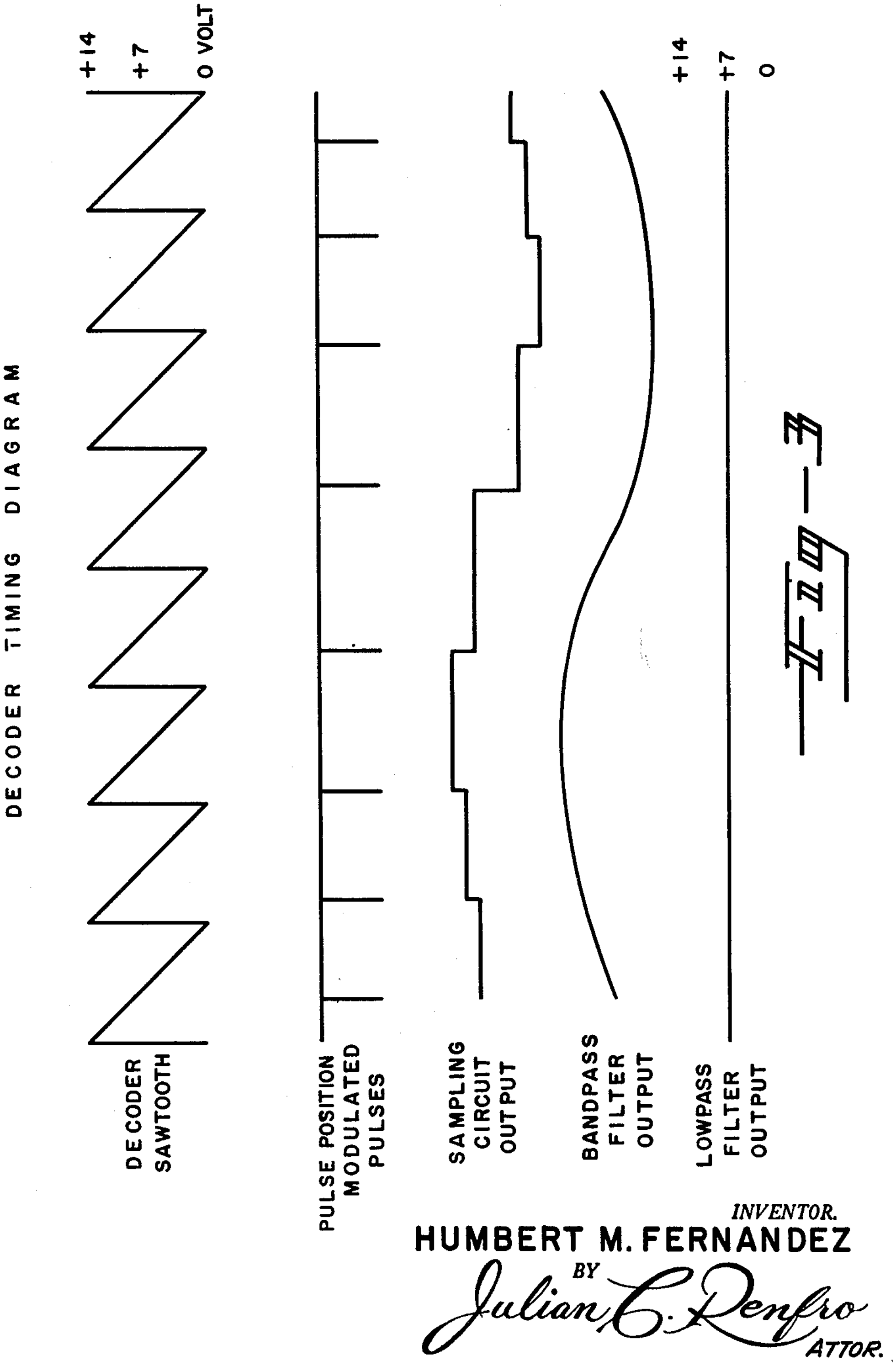
FIGURE 3 is an illustration of waveforms occurring at designated portions of my demodulator.

FIGURE 3 shows waveforms that can be related to the circuits of FIGURES 1 and 2. The decoder sawtooth can be regarded as the output of the waveform generators 10 or 20, and for convenience is here shown as a linear sawtooth with voltages between zero and +14 volts having an average value of +7 volts. These values are shown for illustration, for the invention does not require these particular values. Although a linear sawtooth is shown, modifications of the wave shape may be convenient for specific signals to be handled.

The Pulse Position Modulated Pulses of FIGURE 3 represent the input to the sampler. The position of the pulses with respect to the center portion of the linear sawtooth shown above them represents the voltage of the sampled signal at the time the sample was taken. The Sampling Circuit Output is in the form of a stepped wave, the horizontal portion of the steps representing the voltage value of the samples and the vertical portions representing the changes in the voltage which occur with each sample. This voltage is applied to the bandpass filter input, with the Bandpass Filter Output also appearing in FIGURE 3.

The Lowpass Filter Output shown in FIGURE 3 represents the output when there is no error between the phase of the waveform generator, and the corresponding waveform in the pulse position modulator which produces the pulse position modulated signals. If there were an error the voltage would be greater or less than the value shown, but the action of the circuit would automatically correct the error, causing the low pass filter output to approach the no-error value in a short time. This time is determined by the circuit characteristics, and may be controlled at the will of the designer to best suit a particular application.

Figure 4:
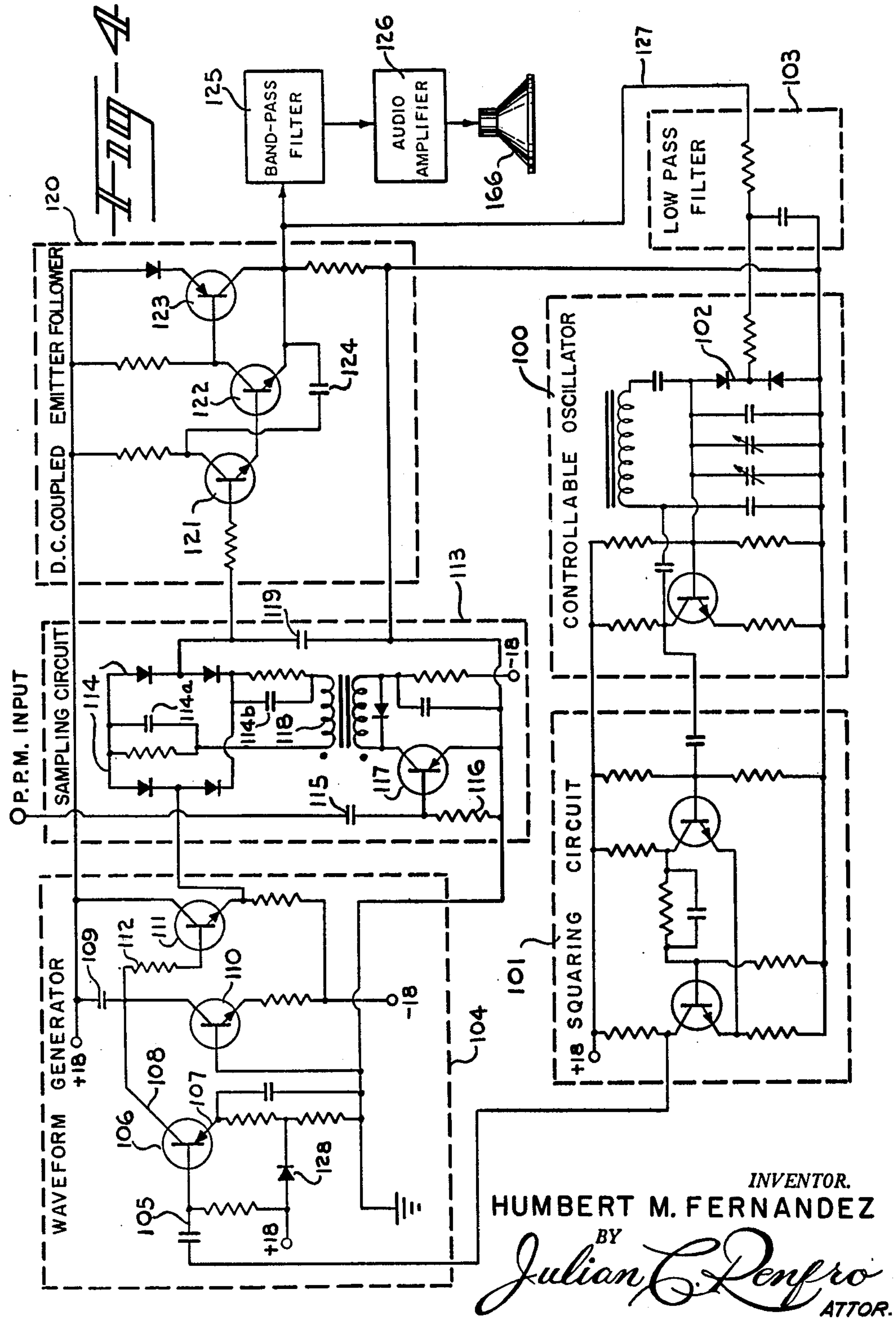
FIGURE 4 is a wiring diagram revealing the detailed construction of a preferred embodiment of my invention.

Referring to FIGURE 4, the waveform generator 104 is provided to furnish an output waveform that is approximately a sawtooth. This output is in synchronism with a controllable oscillator 100, the frequency of which is controlled by external means hereinafter described in detail.

Square waves at a frequency of 8 kc. for example are produced by squaring circuit 101 located between the oscillator 100 and the waveform generator 104. This squaring circuit for example may be a Schmitt Trigger, as illustrated.

RC circuit 105 is provided at the input of the waveform generator 104, the output of which is connected directly to the base of transistor 106. This transistor for example may be of the 2N404 type, which conducts when its base is negative. When this transistor conducts as a result of a negative pulse being received at its base, virtually the full +18 volts that is connected to the emitter 107 through diode 128 is then placed on collector 108. Upon this taking place, there is no difference of potential across sawtooth capacitor 109, for the other side of this capacitor is also connected to +18 volts, so therefore it is discharged.

However, the discharge of capacitor 109 is extremely rapid and immediately thereafter capacitor 109 begins recharging to a negative value through the constant current source formed by transistor 110. However, the minus 18 volts value applied to the emitter of transistor 110 is not reached, because another negative input pulse from the squaring circuit 101 interrupts this negative going trend and causes a steeply rising peak representing the next discharge of this capacitor. Note the decoder sawtooth waveform appearing in FIGURE 3. This steep discharge is caused by the voltage appearing at the collector 108 of the transistor 106. The transistor 110 may for example be of the 2N338 type.

Transistor 111 is an emitter follower which couples the voltage from the sawtooth capacitor 109 through the resistor 112, this sawtooth now appearing at the emitter of transistor 111, and thus is coupled to the input of the sampling circuit 113.

The sampling circuit utilizes four diodes 114, with the incoming sawtooth being blocked by the reverse impedance of two of the diodes, these being backbiased by a residual charge on capacitors 114_a_ and 114_b_ resulting from pulse energy rectified during the previous pulse.

These diodes 114 are preferably diodes of the 1N251 type, but it should be noted that my circuit does not absolutely require the presence of all four diodes, but preferably utilizes four diodes instead of the two diodes required inasmuch as it may be desired to have a bipolar waveform. As will be apparent to those skilled in this art, if this latter possibility is resorted to and a bipolar waveform is used, the emitter follower hereinafter described would have to pass negative voltages as well as the positive voltages that it is presently designed to pass.

Returning to further details of the sampling circuit, this device receives in addition to the sawtooth input from the waveform generator, a pulse input at its PPM Input terminal, this PPM input representing encoded intelligence from the transmitter. These incoming PPM pulses are coupled through capacitor 115 and resistor 116 into the base of transistor 117, which for example may be a transistor of the 2N501 type. A narrow pulse is produced by the collector of transistor 117 which is coupled to diodes 114 by virtue of pulse transformer 118 which serves to isolate the pulse input to sampling circuit from the common ground. The incoming PPM pulse is of such a polarity as to make the diodes 114 conduct, thus allowing the sawtooth from the waveform generator to pass through and charge the capacitor 119 of the sampling circuit, hereinafter referred to as the memory capacitor. Thus it is to be seen that the sampling circuit has an output proportional to the sawtooth amplitude, this output occurring only during the time when a pulse input is present.

Thus, the sampling circuit has a pulse position modulated pulse input, with these pulses determining the time at which the sawtooth voltage is present in the output. As therefore seen, the capacitor 119 holds the charge imparted to it by the sampling circuit until the occurrence of a later pulse position modulated pulse, at which time the voltage becomes that which corresponds to this new pulse. After a series of samples, a stepped waveform appears at capacitor 119 if an alternating voltage modulated the pulse position modulator at the transmitter. An average D.C. voltage also appears at capacitor 119.

The stepped waveform and the average D.C. voltage are applied to the D.C. coupled emitter follower 120 which comprises transistors 121, 122, and 123, the first two of which may for example be 2N338 transistors, whereas transistor 123 may be of the 2N43 type. The emitter of first transistor 121 is coupled to the base of second transistor 122 to obtain a high impedance input. The third transistor 123 serves as an amplifier which obtains its input from the collector of transistor 122, with the output from transistor 123 being fed back from capacitor 124 to the collector of transistor 121 to provide an even higher input impedance to the D.C. coupled emitter follower. Thus, emitter follower 120 is effective to couple the high output impedance of the sampling circuit into the low impedance of the bandpass filter 125 and the low pass filter 103.

The bandpass filter 125 serves to smooth out the stepped waveform, converting it into a sine wave as previously noted in FIGURE 3, with this output being fed for example to an audio amplifier 126 and thence to an appropriate loudspeaker 166 if this type of output is desired.

My decoder amounts to a closed loop system that will operate to cause the controllable oscillator 100 to phase-track or phase-lock to the oscillator at the encoder. Accordingly, an output lead 127 connects the emitter follower 120 with low pass filter 103. This may be a resistance-capacitance device, and functions to allow only the average D.C. output of the emitter follower to pass. In other words, the low pass filter filters out the stepped form and the analog voltage and passes an average D.C. to the diode variable capacitors 102. These capacitors may be of the type marketed under the trade name "Varicaps" which are manufactured by Pacific Semiconductors, Inc., and may for example be silicon diodes of type V39.

The controllable oscillator 100 is a modified Colpitts oscillator which oscillates for example at a nominal frequency of 8 kc. The diodes 102 are utilized in the resonant circuit of the oscillator and their capacity is approximately inversely proportional to the voltage applied by low pass filter 103.

The diodes of the resonant circuit of controllable oscillator 100 represent reactive devices whose capacity is inversely proportional to the input voltage supplied by low pass filter 103. This reactance of diodes 102 serves to increase or decrease the controllable oscillator frequency to track the phase of the encoder at the transmitter. This is accomplished by a correction in the form of an average D.C. voltage which is fed back, and by virtue of this correction, the oscillator can be caused to oscillate at a frequency dependent upon the input voltage.

For example, if the input voltage to the diodes is 7 volts and at that voltage the oscillator oscillates at 8 kc., if the controllable oscillator tends to drift in frequency above 8 kc., the capacitor 119 charges to a value less than 7 volts and because of the essential unity gain of the emitter follower, a correcting voltage input of approximately seven volts to the oscillator 100 is brought about. If on the other hand the oscillator tends to drift below encoder frequency, the memory capacitor 119 charges to a value between 7 and 14 volts, again providing correct frequency and phase from oscillator 100 so that the PPM signal can be demodulated correctly. Although the controllable oscillator is preferably a voltage controlled oscillator, it is within the scope of this invention to use a saturable reactor to control the frequency of the oscillator or any other suitable device. Also a different type of oscillator can be used, such as blocking oscillator or a multivibrator.

It is of course possible to use this invention in other embodiments, such as for example utilizing vacuum tubes, or semiconductors other than transistors as shown in FIGURE 4.

Also, I need not utilize the precise circuit configuration shown herein, for devices 100, 101, 103, 104, 113 and 120 could be replaced by other configurations accomplishing the same purposes.

I claim:

1. A nonreference demodulator comprising electronic means to generate a sawtooth waveform, sampling means for sampling said sawtooth waveform, said sampling means having an input terminal, said sampling means sampling said sawtooth waveform at times determined by sample signal inputs in the form of pulse position modulation pulses received at said input terminal from an external source, said sampling means having a pulse amplitude modulated output proportional to the amplitude of the sawtooth waveform at the time the said sample signal input pulses occur, memory means for retaining this voltage after each sample, thus creating a stepped waveform, bandpass filter means for separating out the desired signal output from said stepped waveform, low pass filter means to extract a direct current output from said memory means, synchronizing means for causing the said sawtooth waveform to become synchronized with the average rate of the said pulse position modulated pulses, said synchronizing means comprising a closed loop feedback circuit which uses said direct current output to control the frequency of said generator of sawtooth waveform.

2. A nonreference pulse position demodulator comprising a waveform generator whose waveform output is approximately a sawtooth and which output is in synchronism with an electronic oscillator whose frequency can be controlled by external means, a sampling circuit for sampling the sawtooth waveforms from said waveform generator at times determined by pulses in the nature of pulse position modulated pulses representing sampling signal inputs to the demodulator, said sampling circuit having a pulse amplitude modulated output independent of the amplitude of said sampling signal inputs, means for coupling said sampling circuit to a low pass filter and to a bandpass filter, a controllable electronic oscillator connected to receive an output from said low pass filter, the frequency of said oscillator being controlled by a characteristic output of said low pass filter, and means for coupling said oscillator to the input of said waveform generator so that said waveform generator can generate an approximately sawtooth waveform in synchronism with the output from said oscillator, and output means from said bandpass filter for supplying an output which is the desired demodulated signal representative of the information contained in said pulse position modulated pulses.

3. A nonreference pulse position demodulator comprising a waveform generator whose waveform output is approximately a sawtooth and which output is in synchronism with an oscillator whose frequency can be controlled by external means, a sampling circuit for sampling the sawtooth waveforms from said waveform generator, said sampling circuit having a pulse position modulated pulse inputs representing sampling signals to said sampling circuit determining the times at which the sawtooth voltage, independent of the amplitude of said sampling signals, is present in the output, said output circuit including a capacitor which holds the charge imparted to it by the sampling circuit until the occurrence of a later pulse position modulated pulse, at which time the voltage becomes that which corresponds to the amplitude represented by such new pulse, means for coupling said sampling circuit to a low pass filter and to a bandpass filter, a controllable electronic oscillator connected to receive an output from said low pass filter, the frequency of said oscillator being controlled by a characteristic output of said low pass filter, and means for coupling said oscillator to the input of said waveform generator so that said waveform generator can generate an approximately sawtooth waveform in synchronism with the output from said oscillator, and output means from said bandpass filter for supplying an output which is the desired demodulated signal representative of the information contained in said pulse position modulated pulses.

4. A nonreference pulse position demodulator comprising a waveform generator whose waveform output is approximately a sawtooth and which output is in synchronism with an oscillator whose frequency can be controlled by external means, a sampling circuit for sampling the sawtooth waveforms from said waveform generator at times determined by pulses in the nature of pulse position modulated pulses representing sampling signal inputs to the demodulator, said sampling circuit having a pulse amplitude modulated output independent of the amplitude of said sampling signal inputs, means for coupling said sampling circuit to a low pass filter and to a bandpass filter, said coupling means including a D.C. coupled emitter follower device for coupling the low impedance of said filters to the high output impedance of said sampling circuit, a controlled electronic oscillator connected to receive an output from said low pass filter, the frequency of said oscillator being controlled by a characteristic output of said low pass filter, and means for coupling said oscillator to the input of said waveform generator so that said waveform generator can generate an approximately sawtooth waveform in synchronism with the output from said controlled oscillator, and output means from said bandpass filter for supplying an output which is the desired demodulated signal representative of the information contained in said pulse position modulated pulses.

5. A nonreference pulse position demodulator comprising a waveform generator whose waveform output is approximately a sawtooth and which output is in synchronism with an oscillator whose frequency can be controlled by external means, a sampling circuit for sampling the sawtooth waveforms from said waveform generator at times determined by pulses in the nature of pulse position modulated pulses representing sampling signal inputs to the demodulator, said sampling circuit having a pulse amplitude modulated output independent of the amplitude of said sampling signal inputs, means for coupling said sampling circuit to a low pass filter and a bandpass filter, a voltage controlled oscillator connected to receive an output from said low pass filter, the frequency of said oscillator being controlled by a characteristic output of said low pass filter, and means for coupling said oscillator to the input of said waveform generator so that said waveform generator can generate an approximately sawtooth waveform in synchronism with the output from said voltage controlled oscillator, and output means from said bandpass filter for supplying an output which is the desired demodulated signal representative of the information contained in said pulse position modulated pulses.

References Cited in the file of this patent

UNITED STATES PATENTS

| | | |
|---|---|---|
| 2,570,013 | Hardenberg | Oct. 2, 1951 |
| 2,912,651 | Leeds | Nov. 10, 1959 |
| 2,962,666 | Pollak | Nov. 29, 1960 |

FOREIGN PATENTS

| | | |
|---|---|---|
| 917,916 | Germany | Sept. 13, 1954 |